United States Patent
Kathrow et al.

(10) Patent No.: US 6,393,438 B1
(45) Date of Patent: May 21, 2002

(54) METHOD AND APPARATUS FOR IDENTIFYING THE EXISTENCE OF DIFFERENCES BETWEEN TWO FILES

(75) Inventors: Bodie Kathrow, San Mateo, CA (US); John R Skelton, III, Woodcliff Lake, NJ (US)

(73) Assignee: Serena Software International, Inc., Burlingame, CA (US)

( * ) Notice: Subject to any disclaimer, the term of this patent is extended or adjusted under 35 U.S.C. 154(b) by 0 days.

(21) Appl. No.: 09/882,910

(22) Filed: Jun. 15, 2001

Related U.S. Application Data (63) Continuation of application No. 09/108,601, filed on Jul. 1, 1998, now Pat. No. 6,263,348.
(60) Provisional application No. 60/090,062, filed on Jun. 19, 1998.

(51) Int. Cl.$^7$ .............................................. G06F 17/30
(52) U.S. Cl. .................... 707/203; 707/202; 707/511; 705/54; 709/202; 709/223; 713/176; 714/6
(58) Field of Search .................. 707/3–6, 103–104, 707/200–203, 1, 100, 502; 709/223, 224; 711/114; 713/200, 201, 176; 714/6; 717/1; 705/54, 80; 380/4

(56) References Cited

U.S. PATENT DOCUMENTS

| | | | | |
|---|---|---|---|---|
| 5,479,654 A | * | 12/1995 | Squibb | 707/203 |
| 5,729,743 A | * | 3/1998 | Squibb | 707/203 |
| 5,745,889 A | * | 4/1998 | Burrows | 707/202 |

(List continued on next page.)

FOREIGN PATENT DOCUMENTS

| EP | 0 336 584 A2 | * 10/1989 | ........... G06F/17/40 |
|---|---|---|---|

OTHER PUBLICATIONS

Cao, Zhiruo et al., Performance of Hashing–Based Schemes for Internet Load Balancing, Proceedings of the IEEE Nineteenth Annual Joint Conference of Computer and Communications Societies, INFOCOM 2000, Mar. 26–30, 2000, vol. 1, pp. 332–341.*

Jain, Raj, "A comparison of Hashing Schemes for Address Lookup in Computer Networks", IEEE Transactions On Communications, vol. 40, No. 10, Oct. 1992, pp. 1570–1573.*

Ramakrishna, M.V. et al., "Efficient Hardware HAshing Functions for High Performance Computers", IEEE Transactions On Computers, vol. 46, No. 12, Dec. 1997, pp. 1378–1381.*

(List continued on next page.)

*Primary Examiner*—Hosain T. Alam
*Assistant Examiner*—Shahid Alam
(74) *Attorney, Agent, or Firm*—Innovation Partners; Charles E. Gotlieb

(57) ABSTRACT

A method and apparatus identifies the existence of differences between two files on a personal computer, such as two versions of a Windows registry file. Portions of each of the files are hashed into a four byte value per portion to produce a set of hash results, and the set of hash results is combined with a four byte size of the portion of the file from which the hash was generated to produce a signature of each file. If the two files are different versions of a Windows registry file, the portion of the file hashed are the values of the Windows registry file. If the two files are different, there is a high probability that the signatures of the two files will be different. The signatures may be compared to provide a strong indicator whether the two files are different. Each four-byte hash from one file can be compared against its counterpart from the other file to determine the portion or portions of the files that differ. Stored portions of one file that are determined to differ may be inserted into corresponding portions of the other file to cause the two files to be equivalent.

18 Claims, 6 Drawing Sheets

U.S. PATENT DOCUMENTS

| | | | | |
|---|---|---|---|---|
| 5,745,906 | A | * | 4/1998 | Squibb .......................... 707/203 |
| 5,794,042 | A | * | 8/1998 | Terada et al. ................... 717/1 |
| 5,799,312 | A | * | 8/1998 | Rigoutsos ................... 707/103 |
| 5,832,220 | A | * | 11/1998 | Johnson et al. ........... 707/104.1 |
| 5,953,415 | A | * | 9/1999 | Neilsen .......................... 380/4 |
| 6,070,159 | A | * | 5/2000 | Wilson et al. ................... 707/3 |
| 6,141,657 | A | * | 10/2000 | Rothberg et al. ............... 707/6 |
| 6,151,676 | A | * | 11/2000 | Cuccia et al. ................ 713/176 |
| 6,216,203 | B1 | * | 4/2001 | Yamaguchi ................. 711/114 |
| 6,219,818 | B1 | * | 4/2001 | Freivald et al. ............. 714/799 |

OTHER PUBLICATIONS

Lo, Ming–Ling et al., "Spatial Hash–Joins", Proceedings of the 1996 ACM SIGMOND International Conference on Management of Data and Symposium on Principles of Database Systems, vol. 25, Issue 2, Jun. 1996, pp. 247–258.*

* cited by examiner

METHOD AND APPARATUS FOR IDENTIFYING THE EXISTENCE OF DIFFERENCES BETWEEN TWO FILES

RELATED APPLICATIONS

This application is a continuation of application Ser. No. 09/108,601, entitled "METHOD AND APPARATUS FOR IDENTIFYING THE EXISTENCE OF DIFFERENCES BETWEEN TWO FILES" filed by Bodie Kathrow and John R. Skelton III on Jul. 1, 1998 now U.S. Pat. No. 6,263,348 having a common assignee as this application, and which claimed the benefit of U.S. Provisional Application No. 60/090,062 entitled, "METHOD AND APPARATUS FOR IDENTIFYING THE EXISTENCE OF DIFFERENCES BETWEEN TWO FILES" filed on Jun. 19, 1998 by Bodie Kathrow and John Skelton and both are hereby incorporated herein by reference in their entirety.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark office patent file or records, but otherwise reserves all copyright rights whatsoever.

FIELD OF THE INVENTION

The present invention is related to computer software and more specifically to computer software for determining the existence of differences between two personal computer files.

BACKGROUND OF THE INVENTION

Computers systems store information in files. Some computer programs use files to store data used by the computer programs. For example, the Windows 95 operating system commercially available from Microsoft Corp. of Redmond, Wash. stores information used by the Windows operating system and other programs running under the Windows operating system in a file referred to as the Windows registry. The Windows registry contains values used to control the operation of the Windows operating system and other programs running under the Windows operating system. In addition to these values, the Windows registry also contains keys which identify each of the values. The Windows 95 operating system and many computer programs running under the Windows 95 operating system insert keys and values into the Windows registry so that the operating system and programs can operate properly.

Occasionally, the operating system or one or more computer programs may operate improperly. Among the many potential causes of such improper operation is a corrupt file used by the computer program. For example, if the Windows registry becomes corrupt, one or more computer programs or the Windows operating system may not operate properly. Because the Windows registry can be modified by any of a large number of programs and the operating system, and the Windows registry is subject to other conventional sources of a file corruption such as disk errors, the Windows registry can be a commonly suspected source of improper operation of the operating system or computer programs.

It may be therefore necessary to determine whether the Windows registry has been modified since the last time the operating system or program operated properly. If such modification has occurred, the improper operation may be resolved by restoring certain values of the Windows registry to contain values identical to those which it contained the last time the operating system or program operated properly.

One way of determining whether the Windows registry has been modified is to store a copy of the registry on a separate disk. If a computer program operates improperly, computer support personnel may visually compare each key and each value corresponding to each key in the Windows registry on the computer containing the operating system or program that is operating improperly with the copy of the Windows registry previously stored. If the Windows registry is different from the copy, the Windows registry may be restored from the copy to identify whether the differences are causing the improper operation of the computer program.

This way of determining whether the Windows registry has been modified is subject to several problems. Although the Windows registry file is relatively small, in a company with tens of thousands of computers each containing a Windows registry, storing a copy of all of the Windows registries used by the employees of the company can utilize significant storage resources. Additionally, such a visual comparison is time-consuming and subject to error.

Therefore, a system and method are needed which can quickly and easily determine whether a file, such as the Windows registry, is different from another file, such as a previously-stored version of the Windows registry, without requiring the resources necessary to duplicate every Windows registry and without requiring a visual comparison of the files.

SUMMARY OF INVENTION

A method and apparatus hashes some or all of two files to be compared, allowing comparison of the hash results to identify whether differences exist between the files (a file can be identified as changed over a period by hashing it at the start and end of the period). Files that hash to a different result may be identified as having differences, and files that hash to the same result may be identified as unlikely to have differences. To reduce the probability that two files that, although different, nevertheless hash to the same result and therefore will be identified as unlikely to have differences, a characteristic of each file, such as the size of each file, may be compared as well. If either the hash or the characteristics are different, the files are identified as having differences. Otherwise, the files are identified as unlikely to have differences. If differences exist between the two files, portions of one file may be used to restore portions of the other file.

The hashing of each of the files may be performed using a hash function that includes exclusive-oring bit values from such file with a finite-sized work area and storing the result in the work area. When all bytes of the work area have been exclusive-ored, each byte of the work area is replaced by a byte which can have a different value, using a translation table of bit values selected from several such tables. After the bytes of the work area have been replaced, the exclusive-or process continues using the replaced values in the work area and any additional values from the file until all of the values of the file have been exclusive-ored into the work area. The work area is then halved in size by exclusive-oring the upper half with the lower half, selecting a table and replacing the result of the exclusive-or of each half of the work area with the corresponding value in the table. The work area is repeatedly halved in this manner until it is four bytes in size to produce a four-byte hash result.

DETAILED DESCRIPTION OF A PREFERRED EMBODIMENT

Figure 1:
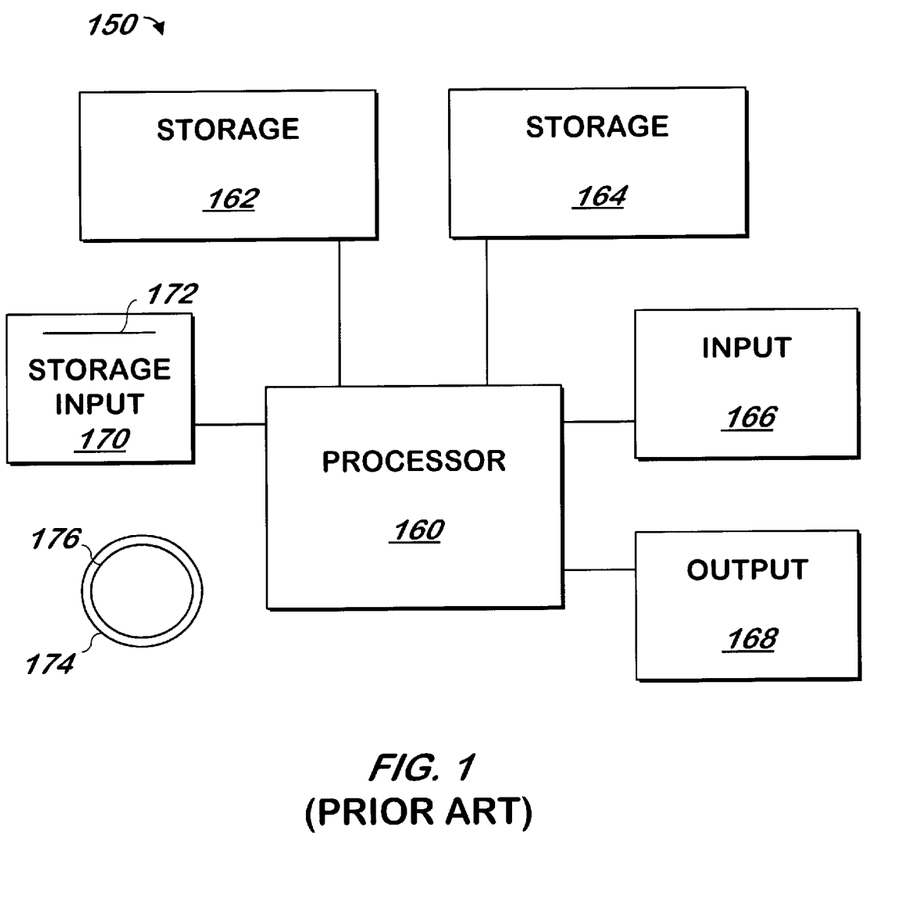
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional IBM-compatible Pentium II personal computer, such as an XPS D333 commercially available from Dell Computer Corporation of Round Rock, Tex. running the Windows 95 operating system commercially available from Microsoft Corporation of Redmond Wash., although other systems may be used.

Figure 2:
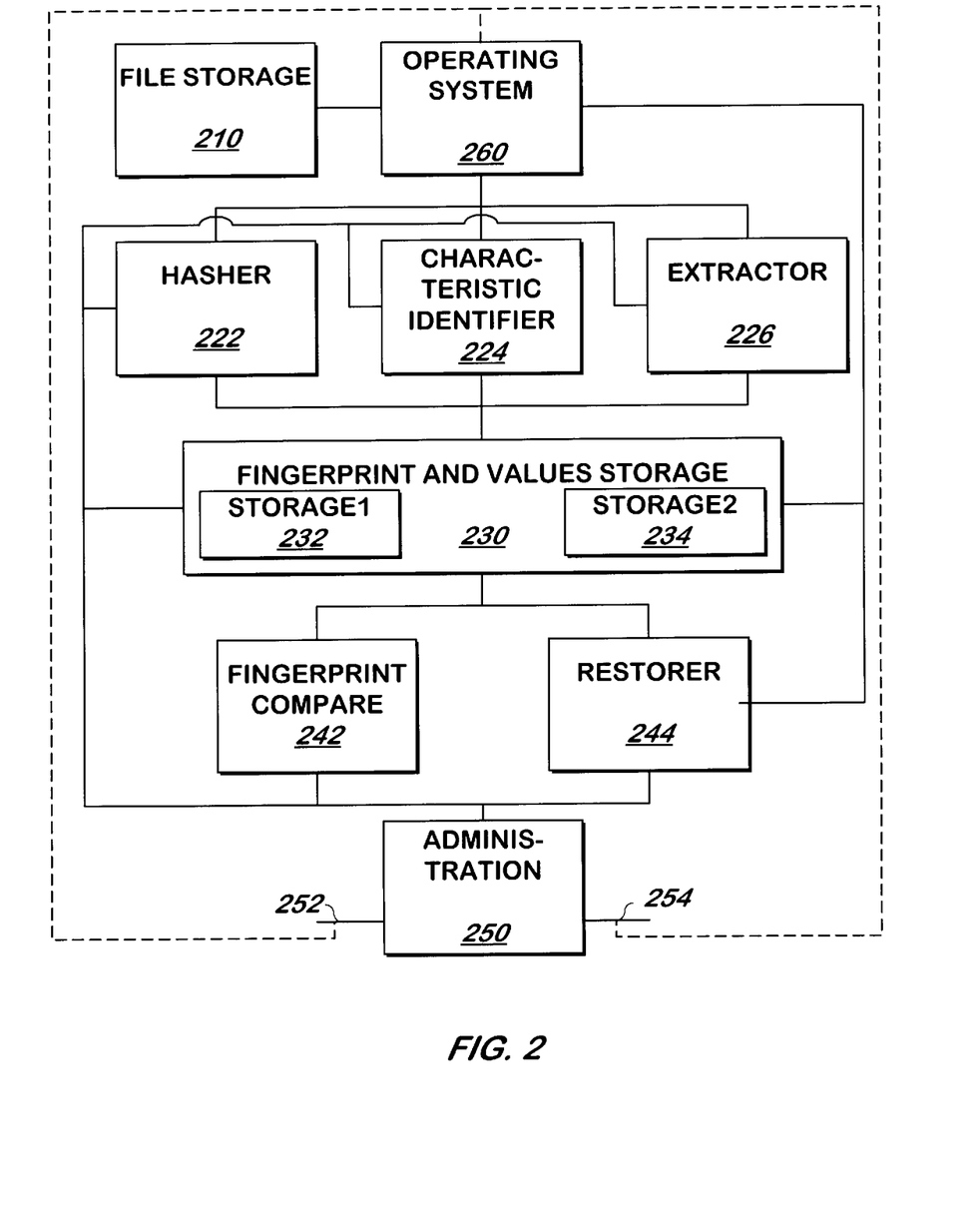
FIG. 2 is a block schematic diagram of an apparatus for determining whether a two personal computer files, such as two versions of a Windows registry file, contain differences according to one embodiment of the present invention.

Referring now to FIG. 2, an apparatus for determining whether a two personal computer files, such as two versions of a Windows registry file, contain differences is shown according to one embodiment of the present invention. The two personal computer files may coexist, or may exist at different points in time. As used herein, the two computer files may in fact be the same file, existing either at a different time or at the same time. The description below describes two versions of the same file at two different points in time, but the present invention also applies to two different files at the same or different times. Additionally, each of the two files may physically exist as a single file or divided into multiple files. The description below uses a Windows registry file as an example, however, the present invention can be applied to any file in a personal computer.

File storage 210 is any storage device such as a hard disk, and stores the Windows registry file at any point in time. Administration 250 receives at input 252 a signal to fingerprint and store the information in the Windows registry file as described in more detail below. In one embodiment, this signal is received from a timer in the operating system 260 such as the Windows operating system commercially available for Microsoft Corporation of Redmond Wash., which has been set by administration 250 via output 254 as shown by the dashed lines in the figure. In another embodiment, this signal is received from an application program or from a user using a keyboard coupled to input 252.

In one embodiment, the signal received at input 252 includes the name of the file stored in file storage 210 that contains the Windows registry. In another embodiment, the Windows registry file is always stored using the same name, and the filename is implied as this name. In response to the signal received at input 252, administration 250 signals hasher 222, characteristic identifier 224 and extractor 226, described below. This signal may contain the filename of the file to be processed.

Hasher 222 hashes some or all of the Windows registry file using a hash function to produce a hash result. In one embodiment, hasher 222 uses one of the hash functions described below to hash the entire Windows registry file, including both values and keys, one value-key pair at a time. In another embodiment, values and keys are hashed using fixed length blocks of bytes, one byte at a time. In another embodiment, only the values from the Windows registry file are hashed by hasher 222. Hasher 222 can use any hash function such as Snerfu, N-Hash, MD2, MD4, MD5, SHA, Ripe-MD, HAVAL. These hash functions are described in more detail in Schnier, "Applied Cryptography, 2d ed." (John Wiley & Sons, Inc. 1996). In another embodiment, hasher 222 uses a different hash function, such as the hash function described in more detailed below.

Characteristic identifier 224 identifies one or more characteristics of the file such as a four-byte long number of bytes of the file stored in file storage 210, the size of a fixed length block of bytes used to hash the file as described below, or the size of the "portion of interest" of such file. The portion of interest is the number of bytes hashed by hasher 222. In one embodiment, the portion of interest is the number of bytes of values in the file. In another embodiment, the portion of interest is the number of values and keys in the file. In one embodiment, characteristic identifier 224 identifies this size by requesting the size of the file from operating system 260. In another embodiment, characteristic identifier 224 requests the file stored in file storage 210 from operating system 260, reads the file, and counts the number of bytes in the file. In still another embodiment, characteristic identifier is a part of the hasher 222, and characteristic identifier counts the number of bytes hashed by hasher 222.

In an alternative embodiment of the present invention, characteristic identifier 224 identifies one or more other characteristics of the file either in place of the size or in addition to the size. Such characteristics can include the location of the file on the disk, last modification or update date of the file, or any other characteristic of the file.

Extractor 226 extracts the values, the records containing the keys and values, or fixed length blocks from the Windows registry file stored in file storage 210. In the description that follows, extractor 226 is described as extracting only values, although these other portions or any other type of portion may be extracted by extractor 226.

In one embodiment, extractor 226 requests the file from operating system 260, extracts the values and discards the keys. In another embodiment, the keys are retained. In one embodiment, the extraction is performed one value at a time, and in other embodiments, other sized portions of the file may be used to extract the file a portion at a time instead of one value at a time.

In one embodiment, hasher 222, characteristic identifier 224, and extractor 226 provide to fingerprint and content storage 230 the hash of the Windows registry file, the size of the Windows registry file, and the values or values and keys extracted from the Windows registry file, respectively. The hash and size are each four-byte values which together are referred to as the "fingerprint" of the file. Fingerprint and content storage 230 stores the fingerprint of the file, and associates this fingerprint with the values or values and keys extracted from the file. In one embodiment, fingerprint and content storage 230 stores the fingerprint and values/keys of the file in storage1 232. As used herein "values/keys" and "keys/values" means either values or values and keys. The filename of the file from which the fingerprint was generated may also be stored in storage1 232.

In one embodiment, the apparatus of the present invention operates as described above one time on a single known good version of the Windows registry file. In another embodiment, the apparatus of the present invention periodically operates as described above and stores in storage1 232 of fingerprint and content storage 230 the fingerprint and values/keys for the Windows registry file at the end of each period. Thus, fingerprint and content storage 230 maintains two or more sets of fingerprints and values. In one embodiment, fingerprint and content storage 230 requests from operating system 260 (via a connection not shown to avoid cluttering the drawing) the date and time at which the fingerprint in values for the Windows registry file are stored in fingerprint and content storage 230. Fingerprint and content storage 230 time stamps each set of fingerprints and values/keys it receives by storing with the set this date and time.

In the event that the Windows registry file is to be compared with a prior version of the Windows registry file, administration 250 receives via input 252 a signal, optionally including a filename, indicating that the Windows registry file is to be compared. Administration 250 signals hasher 222, characteristic identifier 224, and extractor 226. Hasher 222, characteristic identifier 224, and extractor 226 repeat the operation described above on the current version of the Windows registry file stored in file storage 210. In one embodiment, the current version of the Windows registry file is always stored using the same filename, and hasher 222, file size identifier 224, and extractor 226 maintain the name of the Windows registry file to use in requesting operating system 260 to retrieve the file. In another embodiment, administration 250 provides the filename of the file on which the hasher 222, file size identifier 224, and extractor 226 will operate. Administration 250 also signals fingerprint and content storage 230, which stores the fingerprint in values in storage2 234.

If fingerprint and content storage 230 stores several copies of the fingerprints and values/keys for the Windows registry file, date and time stamped as described above, fingerprint and content storage 230 provides each of the date and time stamps for each of the fingerprint and values stored in fingerprint and content storage 230 to administration 250. Administration 250 provides these dates and times at output 254 coupled to a display such as a conventional computer monitor. The user may select one of these sets of fingerprint and values/keys via input 252 coupled to an input device such as a conventional keyboard and mouse. Administration 250 provides an indication of the selected fingerprint and values set to fingerprint and content storage 230. Fingerprint and content storage 230 provides to fingerprint compare 242 the indicated set of fingerprint and values/keys for use in the comparison described below.

Administration 250 signals fingerprint compare 242. Fingerprint compare 242 requests from fingerprint and content storage 230 the fingerprint stored in storage2 234, and the fingerprint from the set of fingerprint and values identified by the user as described above stored in storage1 232. If only one set of fingerprint and values/keys is stored in storage1 232, this fingerprint is provided along with the fingerprint in storage2 234.

Fingerprint compare 242 compares the pair of fingerprints received from fingerprint and content storage 230. If the fingerprints are identical, there is a high probability that the Windows registry files corresponding to each of the pair of fingerprints received by fingerprint compare 242 are identical. If either the hash result or the characteristic of one fingerprint is different from that of the other fingerprint, the files corresponding to these fingerprints are not identical. Fingerprint compare 242 signals administration 250, which signals the user at output 254 coupled to the output device such as a conventional monitor with the result of the comparison.

If the fingerprints received by fingerprint compare 242 are not identical, fingerprint compare 242 provides the comparison result to administration 250, which displays the result to the user via output 254 and indicates that the two Windows registry files compared are not identical. In one embodiment, administration 250 signals restorer 244, and restorer 244 retrieves the values/keys corresponding to the older fingerprint of the pair received by fingerprint compare 242. In one embodiment, restorer 244 provides the values/keys to administration 250 for display to the user via output 254. The user can use the values to identify problems with the Windows registry file by performing a visual comparison of the values provided at output 254 to the values of the current version of the Windows registry file obtained via operating system 260. In one embodiment, the conventional Windows 95 "Regedit" program may be run to view the values of the current version of the Windows registry file.

In another embodiment of the present invention, restorer 244 retrieves the Windows registry file from file storage 210 via operating system 260 and identifies values which may have be different by comparing the values in the current Windows registry file from the values received via fingerprint and the values storage 230. This process is made easier in the embodiment in which the key and value pairs are extracted by extractor 226 and stored in fingerprint and content storage 230 because it is easier to match each key from storage1 232 with its counterpart in storage2 234 than using only the values alone. Restorer 244 prompts the user via administration 250 and output 254 with the suspected different values. The user may use input 252 to communicate the desired substitute value to restorer 244 via administration 250. Restorer 244 substitutes the substitute value go received for the value in the Windows registry file. When restorer 244 completes this process for the entire Windows registry file, restorer 244 stores the Windows registry file with the substituted values into file storage 210 via operating system 260. In one embodiment, the fingerprint and comparison described above may be performed on the new version of the Windows registry file to identify whether any differences remain between the new registry file and the file corresponding to the earlier registry file used in the prior comparison.

Figure 3:
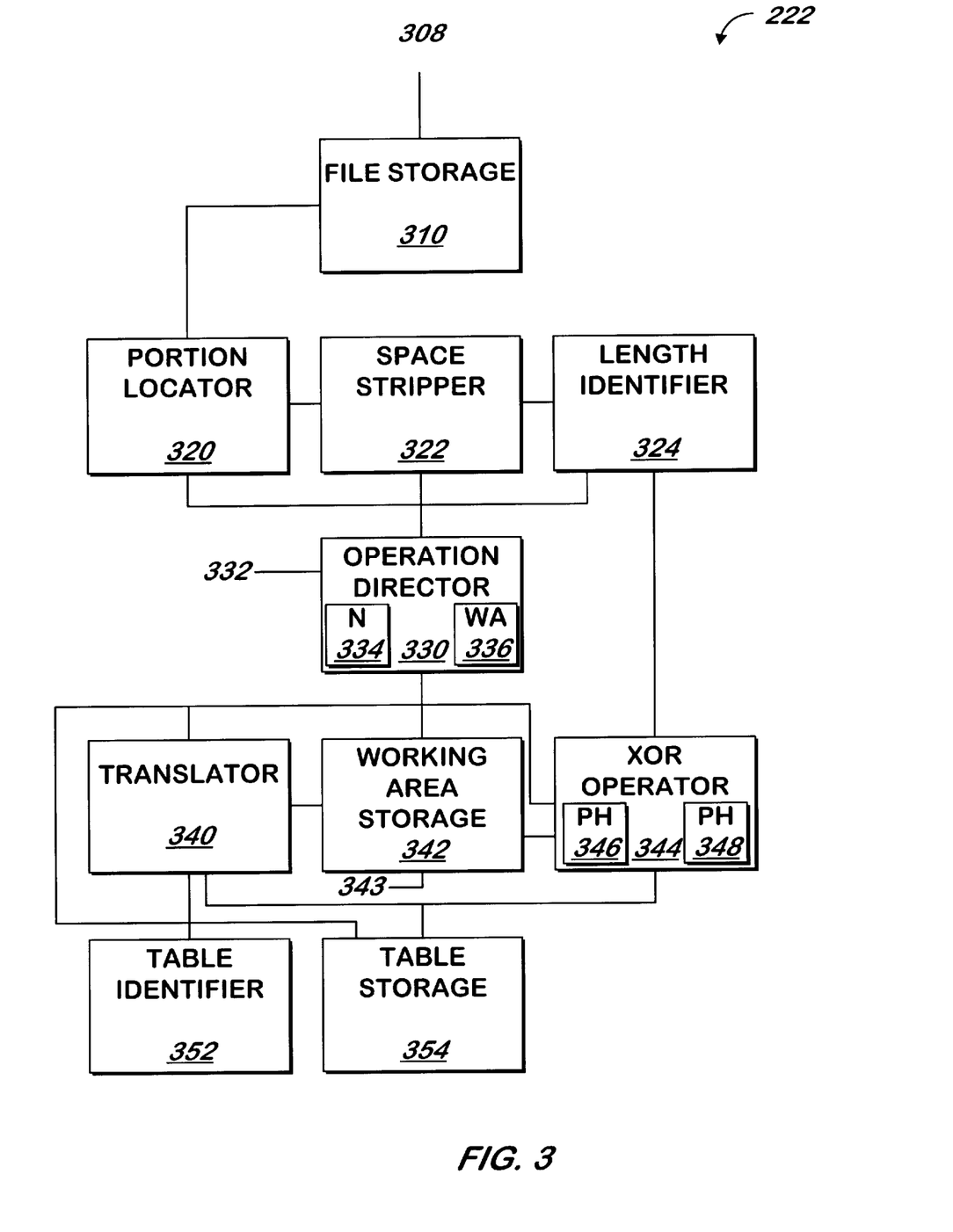
FIG. 3 is a block schematic diagram of a hasher shown in FIG. 2 according to one embodiment of the present invention.

Referring now to FIG. 3, the hasher 222 shown in FIG. 2 is shown in more detail according to one embodiment of the present invention. File storage 310 receives the file at input 308 and operation director 330 receives the signal provided by administration 250 of FIG. 2 as described above. In one embodiment, file storage 310 is file storage 210 and operating system 260 of FIG. 2.

Operation director 330 signals portion locator 320 in response to the signal received at input 332. Portion locator 320 locates the first portion to be hashed in the file stored in file storage 310. In one embodiment, a portion to be hashed is a key-value pair. In another embodiment, a portion to be hashed is a fixed length block from the file. In another embodiment, a portion to be hashed is a record. The description that follows describes a portion to be hashed as a record, but these other types of portions or any other type of portion may be substituted.

In one embodiment, each record in the file stored in file storage 310 corresponds to one of the values of the Windows registry file. In one embodiment, portion locator 320 locates the records in the order in which they are stored in the file. Portion locator 320 passes the record to space stripper 322, which strips any leading spaces from the record. In one embodiment, space stripper 322 strips leading spaces by reducing the size of the record to omit leading spaces. In one embodiment, space stripper 322 identifies both ASCII and EBCDIC spaces, and strips either one from the record.

Space stripper 322 passes the record it receives from portion locator 320 with the leading spaces removed to length identifier 324. Length identifier 324 identifies the length of the record with the spaces stripped using a two-byte length for all records. In one embodiment, length identifier 324 increases the length it identifies by 2 and appends the two-byte length as the two most significant bytes of the record, and passes the resulting record with leading spaces stripped appended to the two-byte length of such record to exclusive-or operator 344. It isn't necessary to physically append the two-byte length to the record (thereby increasing the number of bytes in the record by 2). However, doing so simplifies the operation and description of the hasher 222. In an alternate embodiment, the length remains separate from the record but is treated in the same way as described below.

Exclusive-or operator 344 exclusive-ors each byte of the record received from length identifier 324 with one or more bytes contained in a working area storage 342 as described below. To "exclusive-or" a byte, each of the bits in a byte of the record are combined with corresponding bits in a byte of the working area storage using an exclusive-or function to produce a result. The result for each bit combination is zero if the bit in the byte of the working area storage is equal to the corresponding bit in the byte of the record and the result is one if these bits are not equal. The working area storage 342 is initialized to all '0' by operation director 330 in response to the signal received at input 332.

Working area storage 342 is a 1021-byte addressable storage area. Exclusive-or operator 344 maintains two placeholders 346, 348. Placeholder 346 maintains a number corresponding to the current byte of working area storage 342. Placeholder 348 maintains the current byte of the record received from length identifier 324. Each placeholder 346,348 is initialized to zero by exclusive-or operator 344 upon a signal from the operation director 330 following receipt of the signal at input 332.

Exclusive-or operator 344 exclusive-ors the byte in working area storage corresponding to place holder 346 with the byte corresponding to place holder 348 of the record received from length identifier 324. Following this exclusive-or operation, exclusive-or operator 344 increments each of the place holders 346,348. Exclusive-or operator 344 repeats the exclusive-or operation on each byte of the record received from length identifier 324 in the above manner until place holder 348 is equal to the length of the record received from length identifier 324 or until place holder 346 is equal to 1020.

If place holder 348 is equal to the length received from length identifier 324, another record is to be processed as described above. Before the next record is processed, exclusive-or operator sets place holder 348 equal to zero and signals operation director 330. Operation director 330 signals portion locator 320 to retrieve the next record in file storage 310. If another record exists in the file stored in file storage 310, portion locator 320 retrieves it as described above. The operation of space stripper 322, length identifier 324, and exclusive-or operator 344 is repeated as described above on the new record located by portion locator 320. Note that if place holder 348 is equal to the length received from length identifier 324 and place holder 346 is equal to 1020, the operation of the apparatus described in the following paragraph is performed before the operation of the apparatus as described in this paragraph.

If place holder 346 is equal to 1020, the contents of the working area storage 342 are translated as described below, and processing continues as described above. Exclusive-or operator signals translator 340. Translator 340 requests from table identifier 352 an identifier of a table stored in table storage 354. Translator 340 translates the working area storage 342 using the table in table storage 354 identified by table identifier 352 described in more detail below. Translator 340 translates the working area storage 342 using the following process: for each byte in working area storage 342, translator 340 uses the working area storage byte as an index to a byte in the table of table storage 354 identified by table identifier 352. In one embodiment, table storage 354 contains the seven tables shown in Exhibit A attached hereto. Translator 348 retrieves this byte from the table and stores it in place of the byte in working area storage 342. When translator 340 translates every byte in working area storage 342, translator 340 signals exclusive-or operator 344 to resume operation as described herein. The current record will continue to be exclusive-ored into the working area storage, or another record will be retrieved as described above.

Each time table identifier 352 is requested to identify a table, table identifier 352 selects a different table from the table selected previously and provides the identifier of the selected table to translator 340. In one embodiment, table identifier 352 selects each table by selecting the next table identifier from an ordered set of table identifiers corresponding to all the tables in table storage 354 until all of the identifiers in the set have been selected. If additional table identifiers are requested, table identifier 352 then permutes the order of the identifiers in the set for subsequent requests for a table identifier. Thus, table identifier 352 identifies from the set of the seven table identifiers T0 through T6 one at a time in this order: T0, T1, T2, T3, T4, T5, T6. After the first set of seven table identifiers have been provided by table identifier 352 one at a time, table identifier rearranges the order of the table identifiers it provides, for example T1, T0, T2, T3, T4, T5, T6. After it provides the last identifier in the set, table identifier 352 rearranges the order of the table identifiers so that each ordered full set of seven table identifiers has an order different from the prior ordered full sets of seven table identifiers until all possible permutations of the orders of the seven tables have been used. If additional table identifiers are requested after all possible permutations of the table identifiers have been used, then table identifier 352 repeats the operation described above beginning with the order: T0, T1, T2, T3, T4, T5, T6.

When portion locator 320 is requested to locate an additional record as described above, but no additional records exist in the file stored in file storage 310, portion locator 320 signals operation director 330. In one embodiment, operation director 330 signals translator 340 to translate the working area storage 342 as described above one additional time, and in another embodiment, this additional translation is not performed. In response to the signal from portion locator 320, operation director 330 also initializes two storage areas N 334 and WA 336. N is initialized to a value '6', and WA is initialized to a value '1018'. Operation director 330 provides the number stored in WA 336 to translator 340.

Translator 340 translates, as described herein, the upper half of the portion of working area storage 342 identified by WA 336. The portion includes bytes 0 to WA-1 of the working area storage 342. Therefore, the upper half of working area storage when WA 336 has a value of 1018 are bytes 509–1017. Before translator 340 translates the upper half of the portion of the working area storage 342, translator 340 requests an identifier of the table from table identifier 352. Translator 340 uses the table identified by table identifier 352 and stored in table storage 354 to translate the upper half of the portion of working area storage identified by operation director 330. Translator 340 signals operation director 330 that it has completed the translation process.

Operation director 330 next signals exclusive-or operator 344 by providing the contents of WA 336. Exclusive-or operator 344 exclusive-ors the upper half of the portion of the working area storage 342 identified using the contents of WA 336 with the lower half of the working area storage 342 identified using the contents of WA 336. The result is stored in the lower half of the working area storage 342. Exclusive-or operator 344 signals operation director 330 that the exclusive-or operation has completed. Operation director 330 decrements N 334 and divides WA 336 by two and stores the result of the division into WA 336 in place of the number that was there before. Operation director 330 next signals translator 340 then exclusive-or operator 344 to repeat the procedure described above. Operation director 330 continues to decrement N 334 and divide WA 336 by two and re-signal translator 340 and exclusive-or operator 344 using these new values of N 334 and WA 336 until N equals zero. This procedure results in a hash of the file stored in file storage 310 into four bytes.

Operation director 330 next signals working area storage 342 which provides the four byte result stored in the lower four bytes of working area storage 342 at output 343 to be used as four bytes of the fingerprint described above. The four-byte size of the portion of the file hashed completes the other four bytes of the eight-byte fingerprint in one embodiment, although other number of bytes may be used for the hash result and the size or other characteristic.

Referring now to FIGS. 2 and 3, in one embodiment, the fingerprint is produced in a different manner by hasher 222. Instead of hasher 222 hashing the entire file at once, hasher 222 hashes individual fixed length blocks of the file stored in file storage 210. Hasher hashes each block one at a time. Portion locator 320 locates each block sequentially in the file and hasher 222 hashes the block as described above. However, after each block is hashed, the hash result is output via output 343 and working area storage 342 is reset. This allows each block to be hashed independently of the other blocks because working area storage 342 is reset after each block is hashed.

Fingerprint and content storage 230 assembles the hash results from each block into an ordered set of hash results. Fingerprint and content storage 230 appends to the ordered set of hash results the length or other characteristic of the file received from characteristic identifier 224 in order to create the fingerprint, used as described herein. In one embodiment, a fingerprint created in this manner is referred to as a "signature". Signatures may be created for different versions of a file or for different files like the fingerprints described above. Each signature fingerprint may be stored with an identifier of the file from which the signature was created. Extractor 226 extracts fixed length blocks from the file and stores the blocks into fingerprint and content storage 230 associated with the signature of the file.

In one embodiment, the signature containing the appended hash results of each block of the file and the characteristic is itself hashed as described above, and the hashed signature is stored along with the signature for use in comparing one signature to another.

Fingerprint compare 242 requests from fingerprint and content storage 230 the pair of signatures (and optionally the hash of each signature) corresponding to the two files of interest as described above (for example, having the same one or two different filenames received at input 252 by administration 250 and communicated to fingerprint compare 242). Fingerprint compare 242 compares the two signatures (or the hash of each signature) as described above.

When fingerprint compare 242 compares the signatures or hash of the signatures of two files, if the signatures are different, fingerprint compare 242 can investigate further. to identify the specific blocks that are different between the two files being compared.

Fingerprint compare 242 compares each four-byte hash result received from storage2 234 with the corresponding hash result in the signature of the known-good file that was stored in storage1 232. If the hash results are the same, there is a high probability that the blocks from which the hash results were generated are identical. If the hash results are not the same, the blocks from which the hash results were generated are different. In this embodiment, fingerprint compare 242 compares each hash result, identifies hash results that are different and passes to restorer 244 a set of identifiers of the hash results it identifies as different. In one embodiment, the identifier is '0' for the first hash result, '1' for the second, and so on. If the original fixed length blocks are accessible using a block number, restorer 244 uses each number in the list as a block index to copy the block from the known good file if the known good file is stored unchanged in file storage 210 or from the blocks stored in fingerprint and content storage 230 otherwise, in place of the corresponding block in the other file in file storage 212 via operating system 260. If the original fixed length blocks are accessible using a byte number, restorer 244 multiplies each number in the list by the size in bytes of the fixed length blocks that were used to generate the hash result to produce one product for each number in the list. Each product is used as a byte index to the first byte in a block to be copied from the known good file to the other file. Restorer 244 restores from the known good file to the other file each block in the list in this manner.

Figure 4:
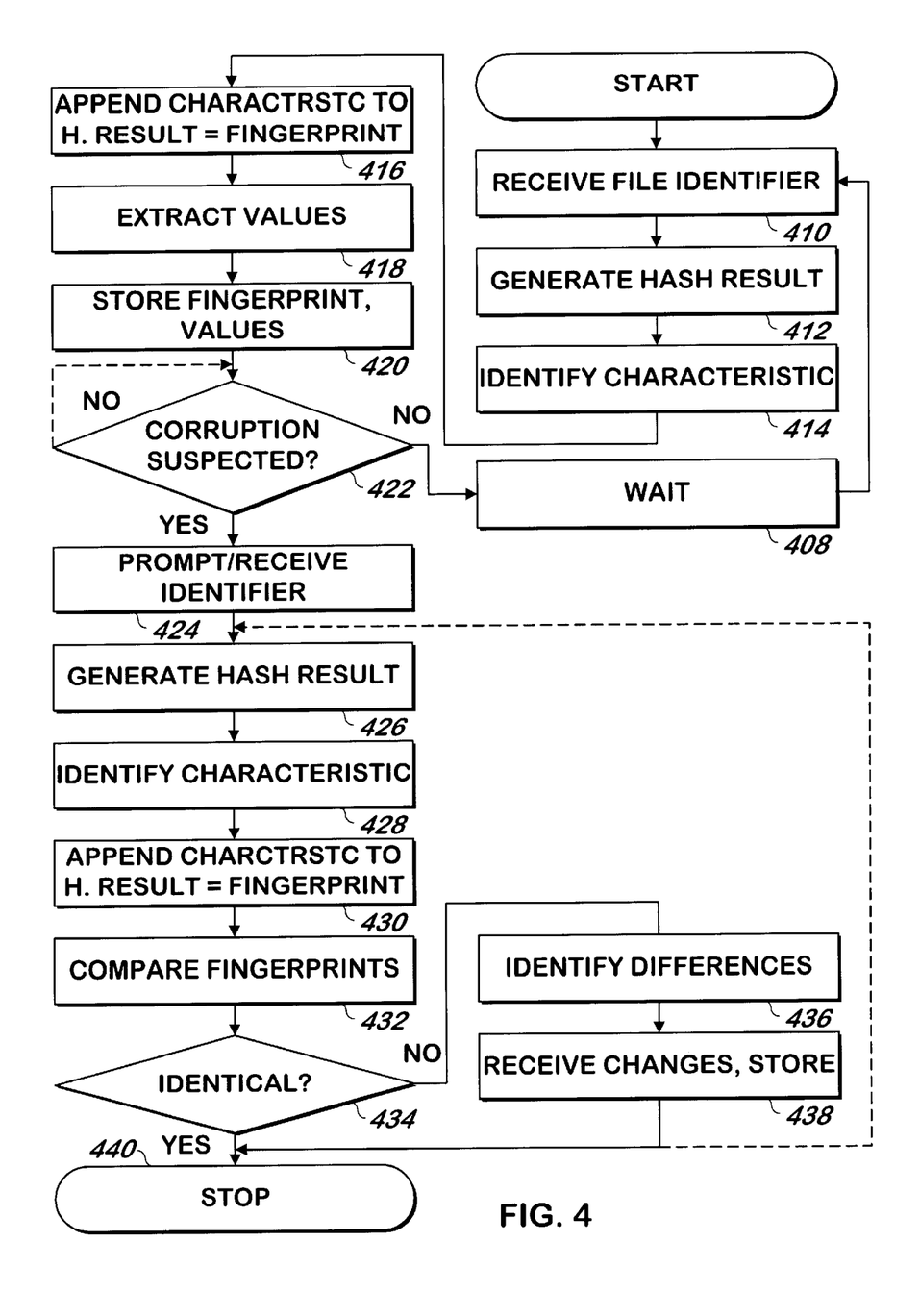
FIG. 4 is a flowchart illustrating a method of determining whether a two personal computer files, such as two versions of a Windows registry file, contain differences according to one embodiment of the present invention.

Referring now to FIG. 4, a method for determining whether a Windows registry file has changed from a prior version is shown according to one embodiment of the present invention. A file identifier such as the name of the Windows registry file is optionally received 410. A hash result is produced from some or all of the file 412. The hash result may be generated from the entire Windows registry file, or from only the values of the Windows registry file. The hash result may be generated using a conventional hash functions such as Snerfu, N-Hash, MD2, MD4, MD5, SHA, Ripe-MD, HAVAL, or any other hash function such as the one described in more detailed herein.

One or more characteristics such as the size of some or all of the file hashed in step 412 is identified 414. In one embodiment, the size of the entire file is identified, and in another embodiment the size of the portion of the file used to generate the hash result in step 412 is identified in step 414. A fingerprint may be generated by appending 416 to the hash result generated in step 412 with the one or more characteristics identified in step 414, however, it is not necessary that the characteristic and hash result actually be appended. Key/value pairs may optionally be extracted from the Windows registry file 418 and stored along with the fingerprint of the file 420. The fingerprint and key/value pairs stored in step 420 may be archived for a later use in step 432 as described below. In one embodiment, step 420 may also include retrieving the date, time or both and storing the date, time or both with the fingerprint and key/values.

If corruption of the Windows registry file is not suspected 422, in one embodiment represented by the dashed line to the left of step 422, the method waits until corruption is suspected. In another embodiment of the present invention, steps 410 through 420 may be repeated several times after a suitable delay 408 such as one week between each repetition, so that several fingerprints and key/value pairs of the Windows registry are produced and stored.

If corruption of the Windows registry is suspected, in one embodiment the name or other identifier of the Windows registry is prompted to a user and received 424. If multiple sets of a fingerprint and key/value pairs were stored through several iterations of step 420 as described above, the specific set of the fingerprint and the key/value pairs is prompted and received as described above as a part of step 424.

A hash result is generated 426 for the current version of the Windows registry file using the same or similar hash technique as was used in step 412. One or more characteristics such as the size of a portion or all of the current version of the Windows registry is identified 428 using one of the techniques described above with reference to step 414. The characteristic identified in step 428 is optionally appended to the hash result from step 426 to generate fingerprint 430. The fingerprint produced in step 430 is compared 432 with the fingerprint stored in step 420 as identified by the user in step 424, if applicable. If the fingerprints are identical 434, the method terminates 440. In one embodiment, step 440 also includes notifying the user whether the fingerprints were identical. If the fingerprints are not identical 434, differences may be identified 436 between the values corresponding to the two fingerprints compared in step 432.

In one embodiment, step 436 comprises displaying the values and keys from the present version of the Windows registry file and displaying the values corresponding to fingerprint of step 420 compared in step 432, and allowing a user to identify differences manually. In another embodiment, differences are identified between such values and the Windows registry file using conventional comparison techniques.

Changes to the Windows registry file may optionally be received and stored into the Windows registry file 438. In one embodiment, those changes are received via input from the user. In another embodiment, the changes are portions of the values corresponding to the fingerprint stored in step 420 and used in the comparison of step 432, extracted in order to minimize the differences between such values and values of the Windows registry file.

In one embodiment, following step 438, the method terminates 440. In another embodiment represented by the dashed line below and to the right of step 438, the method repeats beginning with step 426. This repetition verifies that any changes made in step 438 have caused the current version of the Windows registry file to match the version corresponding to the fingerprint and key/value pairs stored in step 420 and optionally designated by the user in step 424.

Figure 5:
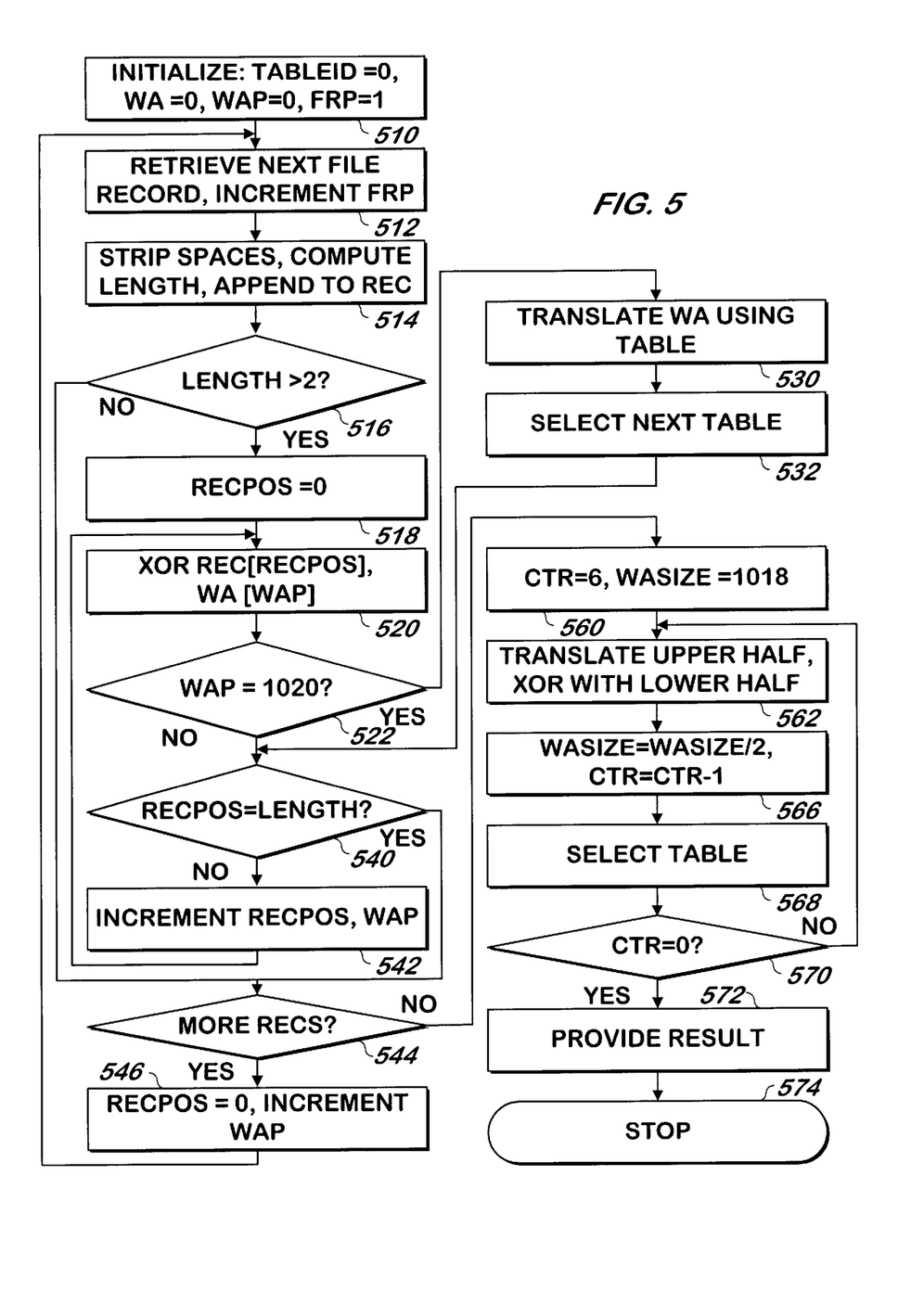
FIG. 5 is a flowchart illustrating each of two hashing steps of FIG. 4 according to one embodiment of the present invention.

Referring now to FIG. 5, a method of generating a hash result as described in steps 412 and 426 of FIG. 4 is shown according to one embodiment of the present invention. A table identifier is initialized to 'zero', a work area pointer is initialized to 'zero' and a work area containing 1021 bytes is initialized to 'zero' 510. A file record pointer is initialized to point to the first record in the file 510.

The file record pointed to by the file record pointer initialized in step 510 is retrieved from a file, and the file record pointer is incremented 512. Leading spaces are stripped 514 from the file record retrieved in step 512. In one embodiment, leading spaces are stripped from both ASCII file records as well as EBCDIC file records as described above. The length of the record stripped of its spaces is computed 514. In one embodiment, the length is computed as a two-byte length, and incremented twice, and this length is appended 514 to the record as the most significant two bytes.

As described above, incrementing and appending the length to the record is not necessary, but because it simplifies the description of the invention, such appending is used herein. In another embodiment, the length may be kept separate from the record, with the appropriate adjustments to the remainder of the method described below. In such embodiment, the length is not incremented twice, so as to represent the length of the record without an appended length.

If the length appended to the front of the record is greater than two 516, the record retrieved in step 512 contains characters other then spaces, and the method continues at step 518. If the length of the record appended in step 514 is equal to two 516, the record contains no data other than the two byte length, and the method continues at step 544, described below.

A record position variable is initialized to zero 518. The record position is a place holder to a current byte in the record as adjusted in step 514. The bits in the byte of the record pointed to by the record position are exclusive-ored with the bits in the byte of the work area pointed to by the work area pointer 520 as described above. If the work area pointer is equal to a value of 1020, the work area is translated using the table pointed to by the table identifier 530, and the next table is selected as the table identifier 532. The translation step 530 is performed by substituting each byte in the work area with the corresponding byte of the selected table identified by TableID, such translation being described in more detail above. The next table is selected in step 532 using the permutation technique described in more detail above and an identifier of the table is stored into the TableID. The method continues at step 540. If the work area pointer is not equal to 1020, the method also continues at step 540.

If the record position is equal to the length of the record 540, all bytes of the record have been processed, and the method continues at step 544. If the record position is not equal to the length of the record, the record position and work area pointer are each incremented 542, and the method continues at step 520.

When the method continues at step 544, either from steps 516 or 540 described above, if more records exist in the file 544, the record position is re-initialized to zero and the work area pointer is incremented 546. The method continues at step 512. If no more records exist in the file 544, a counter is initialized to a value of six, and a work area size variable is initialized to 1018 560. The upper half of the work area bounded by byte zero and the byte indicated by the work area size is translated as described above. The result of the translation is exclusive-ored 562 with the lower half of the work area not translated with the result being stored in the lower half of the work area. The work area size variable is divided in half, and the counter is decremented by one 566. Another table is optionally selected 568. If the counter is not equal to zero 570, steps 562 through 570 are repeated until the counter reaches zero 570. The result of the method shown in FIG. 5 is to hash the file records down to four bytes. These four bytes are provided at step 572 as the hash result, and the method terminates 574.

Figure 6:
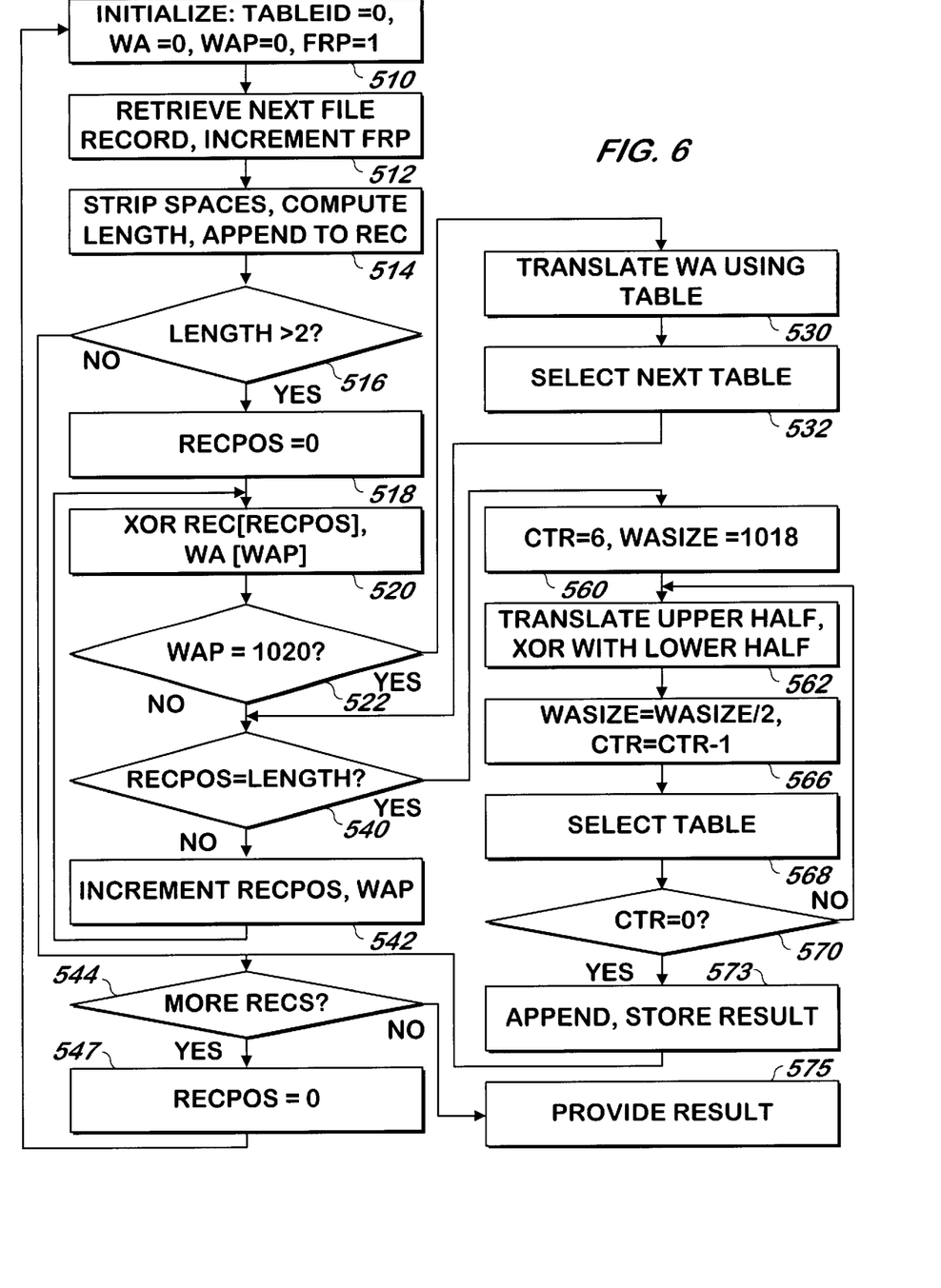
FIG. 6 is a flowchart illustrating each of two hashing steps of FIG. 4 according to an alternate embodiment of the present invention.

If the fingerprint is a signature, a slightly different embodiment of the method of the present invention is used. Referring now to FIG. 6, a method of generating a hash result as described in steps 412 and 426 of FIG. 4 is shown according to one embodiment of the present invention. The hash result generated in steps 412 and 426 is a series of hash results generated as shown in FIG. 6 and described below.

The steps of FIG. 6 operate as described with respect to FIG. 5, with the following exceptions. Each record corresponds to a fixed-length block of values or values and keys. If the record position is equal to the length 540 of the record, the method continues at step 560. If there are no more records 544, the hash result created from the last iteration of step 573 is provided 575. Step 573 replaces step 572 of FIG. 5 and involves appending the hash result from the last iteration of step 566, e.g. by storing it in addition, to any prior hash results. If no prior hash result exists, it is stored. Step 544 follows step 573. Step 547 operates as step 546 of FIG. 5, except the work area pointer does not need to be incremented as in step 546. Step 510 follows step 547. As described above, a hash of all of the hash results may be made and provided in addition to the individual hash results provided as part of step 575.

The effect is to create a hash result for each fixed length block using the technique described above for FIG. 5 hashing each fixed length block separately with an optional hash of the hash results. The signature fingerprint is then made up of the ordered collection of hash results for each fixed length block as well as the characteristic or characteristics and an optional hash of the ordered collection of hash results. Instead of the values or values and keys being stored as part of step 420, fixed length blocks are stored in addition to the fingerprint.

The use of signatures operates similarly to that of other types of fingerprints described above with respect to FIG. 4, with the following differences. Blocks may be stored from the known good file in place of values/keys as part of step 420. The signatures may be compared as described in step 434 of FIG. 4, either with each fingerprint treated as a unit, or by comparing the individual hash results that make up the signature. If the signatures are compared as a unit, the hash of the hash results may be used to compare the signatures in step 432. If differences exist, corresponding individual hash results from each signature are compared to identify differences in step 436. The blocks stored in step 420 that correspond to the individual hash results identified in step 436 may be received from the known good file or from the blocks optionally stored in step 420 and stored in the other file or file version as part of step 438 to match the other file or version with the known good file or version.

Exhibit A—Tables

TABLE 0

0x00, 0x02, 0x01, 0x03, 0x04, 0x06, 0x05, 0x07,
0x08, 0x0A, 0x09, 0x0B, 0x0C, 0x0E, 0x0D, 0x0F,
0x10, 0x12, 0x11, 0x13, 0x14, 0x16, 0x15, 0x17,
0x18, 0x1A, 0x19, 0x1B, 0x1C, 0x1E, 0x1D, 0x1F,
0x20, 0x22, 0x21, 0x23, 0x24, 0x26, 0x25, 0x27,
0x28, 0x2A, 0x29, 0x2B, 0x2C, 0x2E, 0x2D, 0x2F,
0x30, 0x32, 0x31, 0x33, 0x34, 0x36, 0x35, 0x37,
0x38, 0x3A, 0x39, 0x3B, 0x3C, 0x3E, 0x3D, 0x3F,
0x40, 0x42, 0x41, 0x43, 0x44, 0x46, 0x45, 0x47,
0x48, 0x4A, 0x49, 0x4B, 0x4C, 0x4E, 0x4D, 0x4F,
0x50, 0x52, 0x51, 0x53, 0x54, 0x56, 0x55, 0x57,
0x58, 0x5A, 0x59, 0x5B, 0x5C, 0x5E, 0x5D, 0x5F,
0x60, 0x62, 0x61, 0x63, 0x64, 0x66, 0x65, 0x67,
0x68, 0x6A, 0x69, 0x6B, 0x6C, 0x6E, 0x6D, 0x6F,
0x70, 0x72, 0x71, 0x73, 0x74, 0x76, 0x75, 0x77,
0x78, 0x7A, 0x79, 0x7B, 0x7C, 0x7E, 0x7D, 0x7F,
0x80, 0x82, 0x81, 0x83, 0x84, 0x86, 0x85, 0x87,
0x88, 0x8A, 0x89, 0x8B, 0x8C, 0x8E, 0x8D, 0x8F,
0x90, 0x92, 0x91, 0x93, 0x94, 0x96, 0x95, 0x97,
0x98, 0x9A, 0x99, 0x9B, 0x9C, 0x9E, 0x9D, 0x9F,
0xA0, 0xA2, 0xA1, 0xA3, 0xA4, 0xA6, 0xA5, 0xA7,
0xA8, 0xAA, 0xA9, 0xAB, 0xAC, 0xAE, 0xAD, 0xAF,
0xB0, 0xB2, 0xB1, 0xB3, 0xB4, 0xB6, 0xB5, 0xB7,
0xB8, 0xBA, 0xB9, 0xBB, 0xBC, 0xBE, 0xBD, 0xBF,
0xC0, 0xC2, 0xC1, 0xC3, 0xC4, 0xC6, 0xC5, 0xC7,
0xC8, 0xCA, 0xC9, 0xCB, 0xCC, 0xCE, 0xCD, 0xCF,
0xD0, 0xD2, 0xD1, 0xD3, 0xD4, 0xD6, 0xD5, 0xD7,
0xD8, 0xDA, 0xD9, 0xDB, 0xDC, 0xDE, 0xDD, 0xDF,
0xE0, 0xE2, 0xE1, 0xE3, 0xE4, 0xE6, 0xE5, 0xE7,
0xE8, 0xEA, 0xE9, 0xEB, 0xEC, 0xEE, 0xED, 0xEF,
0xF0, 0xF2, 0xF1, 0xF3, 0xF4, 0xF6, 0xF5, 0xF7,
0xF8, 0xFA, 0xF9, 0xFB, 0xFC, 0xFE, 0xFD, 0xFF,

TABLE 1

0x00, 0x04, 0x02, 0x06, 0x01, 0x05, 0x03, 0x07,
0x08, 0x0C, 0x0A, 0x0E, 0x09, 0x0D, 0x0B, 0x0F,
0x10, 0x14, 0x12, 0x16, 0x11, 0x15, 0x13, 0x17,
0x18, 0x1C, 0x1A, 0x1E, 0x19, 0x1D, 0x1B, 0x1F,
0x20, 0x24, 0x22, 0x26, 0x21, 0x25, 0x23, 0x27,
0x28, 0x2C, 0x2A, 0x2E, 0x29, 0x2D, 0x2B, 0x2F,
0x30, 0x34, 0x32, 0x36, 0x31, 0x35, 0x33, 0x37,
0x38, 0x3C, 0x3A, 0x3E, 0x39, 0x3D, 0x3B, 0x3F,
0x40, 0x44, 0x42, 0x46, 0x41, 0x45, 0x43, 0x47,
0x48, 0x4C, 0x4A, 0x4E, 0x49, 0x4D, 0x4B, 0x4F,
0x50, 0x54, 0x52, 0x56, 0x51, 0x55, 0x53, 0x57,
0x58, 0x5C, 0x5A, 0x5E, 0x59, 0x5D, 0x5B, 0x5F,
0x60, 0x64, 0x62, 0x66, 0x61, 0x65, 0x63, 0x67,
0x68, 0x6C, 0x6A, 0x6E, 0x69, 0x6D, 0x6B, 0x6F,
0x70, 0x74, 0x72, 0x76, 0x71, 0x75, 0x73, 0x77,
0x78, 0x7C, 0x7A, 0x7E, 0x79, 0x7D, 0x7B, 0x7F,
0x80, 0x84, 0x82, 0x86, 0x81, 0x85, 0x83, 0x87,
0x88, 0x8C, 0x8A, 0x8E, 0x89, 0x8D, 0x8B, 0x8F,
0x90, 0x94, 0x92, 0x96, 0x91, 0x95, 0x93, 0x97,
0x98, 0x9C, 0x9A, 0x9E, 0x99, 0x9D, 0x9B, 0x9F,

TABLE 1-continued

0xA0, 0xA4, 0xA2, 0xA6, 0xA1, 0xA5, 0xA3, 0xA7,
0xA8, 0xAC, 0xAA, 0xAE, 0xA9, 0xAD, 0xAB, 0xAF,
0xB0, 0xB4, 0xB2, 0xB6, 0xB1, 0xB5, 0xB3, 0xB7,
0xB8, 0xBC, 0xBA, 0xBE, 0xB9, 0xBD, 0xBB, 0xBF,
0xC0, 0xC4, 0xC2, 0xC6, 0xC1, 0xC5, 0xC3, 0xC7,
0xC8, 0xCC, 0xCA, 0xCE, 0xC9, 0xCD, 0xCB, 0xCF,
0xD0, 0xD4, 0xD2, 0xD6, 0xD1, 0xD5, 0xD3, 0xD7,
0xD8, 0xDC, 0xDA, 0xDE, 0xD9, 0xDD, 0xDB, 0xDF,
0xE0, 0xE4, 0xE2, 0xE6, 0xE1, 0xE5, 0xE3, 0xE7,
0xE8, 0xEC, 0xEA, 0xEE, 0xE9, 0xED, 0xEB, 0xEF,
0xF0, 0xF4, 0xF2, 0xF6, 0xF1, 0xF5, 0xF3, 0xF7,
0xF8, 0xFC, 0xFA, 0xFE, 0xF9, 0xFD, 0xFB, 0xFF,

TABLE 2

0x00, 0x08, 0x04, 0x0C, 0x02, 0x0A, 0x06, 0x0E,
0x01, 0x09, 0x05, 0x0D, 0x03, 0x0B, 0x07, 0x0F,
0x10, 0x18, 0x14, 0x1C, 0x12, 0x1A, 0x16, 0x1E,
0x11, 0x19, 0x15, 0x1D, 0x13, 0x1B, 0x17, 0x1F,
0x20, 0x28, 0x24, 0x2C, 0x22, 0x2A, 0x26, 0x2E,
0x21, 0x29, 0x25, 0x2D, 0x23, 0x2B, 0x27, 0x2F,
0x30, 0x38, 0x34, 0x3C, 0x32, 0x3A, 0x36, 0x3E,
0x31, 0x39, 0x35, 0x3D, 0x33, 0x3B, 0x37, 0x3F,
0x40, 0x48, 0x44, 0x4C, 0x42, 0x4A, 0x46, 0x4E,
0x41, 0x49, 0x45, 0x4D, 0x43, 0x4B, 0x47, 0x4F,
0x50, 0x58, 0x54, 0x5C, 0x52, 0x5A, 0x56, 0x5E,
0x51, 0x59, 0x55, 0x5D, 0x53, 0x5B, 0x57, 0x5F,
0x60, 0x68, 0x64, 0x6C, 0x62, 0x6A, 0x66, 0x6E,
0x61, 0x69, 0x65, 0x6D, 0x63, 0x6B, 0x67, 0x6F,
0x70, 0x78, 0x74, 0x7C, 0x72, 0x7A, 0x76, 0x7E,
0x71, 0x79, 0x75, 0x7D, 0x73, 0x7B, 0x77, 0x7F,
0x80, 0x88, 0x84, 0x8C, 0x82, 0x8A, 0x86, 0x8E,
0x81, 0x89, 0x85, 0x8D, 0x83, 0x8B, 0x87, 0x8F,
0x90, 0x98, 0x94, 0x9C, 0x92, 0x9A, 0x96, 0x9E,
0x91, 0x99, 0x95, 0x9D, 0x93, 0x9B, 0x97, 0x9F,
0xA0, 0xA8, 0xA4, 0xAC, 0xA2, 0xAA, 0xA6, 0xAE,
0xA1, 0xA9, 0xA5, 0xAD, 0xA3, 0xAB, 0xA7, 0xAF,
0xB0, 0xB8, 0xB4, 0xBC, 0xB2, 0xBA, 0xB6, 0xBE,
0xB1, 0xB9, 0xB5, 0xBD, 0xB3, 0xBB, 0xB7, 0xBF,
0xC0, 0xC8, 0xC4, 0xCC, 0xC2, 0xCA, 0xC6, 0xCE,
0xC1, 0xC9, 0xC5, 0xCD, 0xC3, 0xCB, 0xC7, 0xCF,
0xD0, 0xD8, 0xD4, 0xDC, 0xD2, 0xDA, 0xD6, 0xDE,
0xD1, 0xD9, 0xD5, 0xDD, 0xD3, 0xDB, 0xD7, 0xDF,
0xE0, 0xE8, 0xE4, 0xEC, 0xE2, 0xEA, 0xE6, 0xEE,
0xE1, 0xE9, 0xE5, 0xED, 0xE3, 0xEB, 0xE7, 0xEF,
0xF0, 0xF8, 0xF4, 0xFC, 0xF2, 0xFA, 0xF6, 0xFE,
0xF1, 0xF9, 0xF5, 0xFD, 0xF3, 0xFB, 0xF7, 0xFF,

TABLE 3

0x00, 0x10, 0x08, 0x18, 0x04, 0x14, 0x0C, 0x1C,
0x02, 0x12, 0x0A, 0x1A, 0x06, 0x16, 0x0E, 0x1E,
0x01, 0x11, 0x09, 0x19, 0x05, 0x15, 0x0D, 0x1D,
0x03, 0x13, 0x0B, 0x1B, 0x07, 0x17, 0x0F, 0x1F,
0x20, 0x30, 0x28, 0x38, 0x24, 0x34, 0x2C, 0x3C,
0x22, 0x32, 0x2A, 0x3A, 0x26, 0x36, 0x2E, 0x3E,
0x21, 0x31, 0x29, 0x39, 0x25, 0x35, 0x2D, 0x3D,
0x23, 0x33, 0x2B, 0x3B, 0x27, 0x37, 0x2F, 0x3F,
0x40, 0x50, 0x48, 0x58, 0x44, 0x54, 0x4C, 0x5C,
0x42, 0x52, 0x4A, 0x5A, 0x46, 0x56, 0x4E, 0x5E,
0x41, 0x51, 0x49, 0x59, 0x45, 0x55, 0x4D, 0x5D,
0x43, 0x53, 0x4B, 0x5B, 0x47, 0x57, 0x4F, 0x5F,
0x60, 0x70, 0x68, 0x78, 0x64, 0x74, 0x6C, 0x7C,
0x62, 0x72, 0x6A, 0x7A, 0x66, 0x76, 0x6E, 0x7E,
0x61, 0x71, 0x69, 0x79, 0x65, 0x75, 0x6D, 0x7D,
0x63, 0x73, 0x6B, 0x7B, 0x67, 0x77, 0x6F, 0x7F,
0x80, 0x90, 0x88, 0x98, 0x84, 0x94, 0x8C, 0x9C,
0x82, 0x92, 0x8A, 0x9A, 0x86, 0x96, 0x8E, 0x9E,
0x81, 0x91, 0x89, 0x99, 0x85, 0x95, 0x8D, 0x9D,
0x83, 0x93, 0x8B, 0x9B, 0x87, 0x97, 0x8F, 0x9F,
0xA0, 0xB0, 0xA8, 0xB8, 0xA4, 0xB4, 0xAC, 0xBC,
0xA2, 0xB2, 0xAA, 0xBA, 0xA6, 0xB6, 0xAE, 0xBE,
0xA1, 0xB1, 0xA9, 0xB9, 0xA5, 0xB5, 0xAD, 0xBD,
0xA3, 0xB3, 0xAB, 0xBB, 0xA7, 0xB7, 0xAF, 0xBF,

TABLE 3-continued

0xC0, 0xD0, 0xC8, 0xD8, 0xC4, 0xD4, 0xCC, 0xDC,
0xC2, 0xD2, 0xCA, 0xDA, 0xC6, 0xD6, 0xCE, 0xDE,
0xC1, 0xD1, 0xC9, 0xD9, 0xC5, 0xD5, 0xCD, 0xDD,
0xC3, 0xD3, 0xCB, 0xDB, 0xC7, 0xD7, 0xCF, 0xDF,
0xE0, 0xF0, 0xE8, 0xF8, 0xE4, 0xF4, 0xEC, 0xFC,
0xE2, 0xF2, 0xEA, 0xFA, 0xE6, 0xF6, 0xEE, 0xFE,
0xE1, 0xF1, 0xE9, 0xF9, 0xE5, 0xF5, 0xED, 0xFD,
0xE3, 0xF3, 0xEB, 0xFB, 0xE7, 0xF7, 0xEF, 0xFF,

TABLE 4

0x00, 0x20, 0x10, 0x30, 0x08, 0x28, 0x18, 0x38,
0x04, 0x24, 0x14, 0x34, 0x0C, 0x2C, 0x1C, 0x3C,
0x02, 0x22, 0x12, 0x32, 0x0A, 0x2A, 0x1A, 0x3A,
0x06, 0x26, 0x16, 0x36, 0x0E, 0x2E, 0x1E, 0x3E,
0x01, 0x21, 0x11, 0x31, 0x09, 0x29, 0x19, 0x39,
0x05, 0x25, 0x15, 0x35, 0x0D, 0x2D, 0x1D, 0x3D,
0x03, 0x23, 0x13, 0x33, 0x0B, 0x2B, 0x1B, 0x3B,
0x07, 0x27, 0x17, 0x37, 0x0F, 0x2F, 0x1F, 0x3F,
0x40, 0x60, 0x50, 0x70, 0x48, 0x68, 0x58, 0x78,
0x44, 0x64, 0x54, 0x74, 0x4C, 0x6C, 0x5C, 0x7C,
0x42, 0x62, 0x52, 0x72, 0x4A, 0x6A, 0x5A, 0x7A,
0x46, 0x66, 0x56, 0x76, 0x4E, 0x6E, 0x5E, 0x7E,
0x41, 0x61, 0x51, 0x71, 0x49, 0x69, 0x59, 0x79,
0x45, 0x65, 0x55, 0x75, 0x4D, 0x6D, 0x5D, 0x7D,
0x43, 0x63, 0x53, 0x73, 0x4B, 0x6B, 0x5B, 0x7B,
0x47, 0x67, 0x57, 0x77, 0x4F, 0x6F, 0x5F, 0x7F,
0x80, 0xA0, 0x90, 0xB0, 0x88, 0xA8, 0x98, 0xB8,
0x84, 0xA4, 0x94, 0xB4, 0x8C, 0xAC, 0x9C, 0xBC,
0x82, 0xA2, 0x92, 0xB2, 0x8A, 0xAA, 0x9A, 0xBA,
0x86, 0xA6, 0x96, 0xB6, 0x8E, 0xAE, 0x9E, 0xBE,
0x81, 0xA1, 0x91, 0xB1, 0x89, 0xA9, 0x99, 0xB9,
0x85, 0xA5, 0x95, 0xB5, 0x8D, 0xAD, 0x9D, 0xBD,
0x83, 0xA3, 0x93, 0xB3, 0x8B, 0xAB, 0x9B, 0xBB,
0x87, 0xA7, 0x97, 0xB7, 0x8F, 0xAF, 0x9F, 0xBF,
0xC0, 0xE0, 0xD0, 0xF0, 0xC8, 0xE8, 0xD8, 0xF8,
0xC4, 0xE4, 0xD4, 0xF4, 0xCC, 0xEC, 0xDC, 0xFC,
0xC2, 0xE2, 0xD2, 0xF2, 0xCA, 0xEA, 0xDA, 0xFA,
0xC6, 0xE6, 0xD6, 0xF6, 0xCE, 0xEE, 0xDE, 0xFE,
0xC1, 0xE1, 0xD1, 0xF1, 0xC9, 0xE9, 0xD9, 0xF9,
0xC5, 0xE5, 0xD5, 0xF5, 0xCD, 0xED, 0xDD, 0xFD,
0xC3, 0xE3, 0xD3, 0xF3, 0xCB, 0xEB, 0xDB, 0xFB,
0xC7, 0xE7, 0xD7, 0xF7, 0xCF, 0xEF, 0xDF, 0xFF,

TABLE 5

0x00, 0x40, 0x20, 0x60, 0x10, 0x50, 0x30, 0x70,
0x08, 0x48, 0x28, 0x68, 0x18, 0x58, 0x38, 0x78,
0x04, 0x44, 0x24, 0x64, 0x14, 0x54, 0x34, 0x74,
0x0C, 0x4C, 0x2C, 0x6C, 0x1C, 0x5C, 0x3C, 0x7C,
0x02, 0x42, 0x22, 0x62, 0x12, 0x52, 0x32, 0x72,
0x0A, 0x4A, 0x2A, 0x6A, 0x1A, 0x5A, 0x3A, 0x7A,
0x06, 0x46, 0x26, 0x66, 0x16, 0x56, 0x36, 0x76,
0x0E, 0x4E, 0x2E, 0x6E, 0x1E, 0x5E, 0x3E, 0x7E,
0x01, 0x41, 0x21, 0x61, 0x11, 0x51, 0x31, 0x71,
0x09, 0x49, 0x29, 0x69, 0x19, 0x59, 0x39, 0x79,
0x05, 0x45, 0x25, 0x65, 0x15, 0x55, 0x35, 0x75,
0x0D, 0x4D, 0x2D, 0x6D, 0x1D, 0x5D, 0x3D, 0x7D,
0x03, 0x43, 0x23, 0x63, 0x13, 0x53, 0x33, 0x73,
0x0B, 0x4B, 0x2B, 0x6B, 0x1B, 0x5B, 0x3B, 0x7B,
0x07, 0x47, 0x27, 0x67, 0x17, 0x57, 0x37, 0x77,
0x0F, 0x4F, 0x2F, 0x6F, 0x1F, 0x5F, 0x3F, 0x7F,
0x80, 0xC0, 0xA0, 0xE0, 0x90, 0xD0, 0xB0, 0xF0,
0x88, 0xC8, 0xA8, 0xE8, 0x98, 0xD8, 0xB8, 0xF8,
0x84, 0xC4, 0xA4, 0xE4, 0x94, 0xD4, 0xB4, 0xF4,
0x8C, 0xCC, 0xAC, 0xEC, 0x9C, 0xDC, 0xBC, 0xFC,
0x82, 0xC2, 0xA2, 0xE2, 0x92, 0xD2, 0xB2, 0xF2,
0x8A, 0xCA, 0xAA, 0xEA, 0x9A, 0xDA, 0xBA, 0xFA,
0x86, 0xC6, 0xA6, 0xE6, 0x96, 0xD6, 0xB6, 0xF6,
0x8E, 0xCE, 0xAE, 0xEE, 0x9E, 0xDE, 0xBE, 0xFE,
0x81, 0xC1, 0xA1, 0xE1, 0x91, 0xD1, 0xB1, 0xF1,
0x89, 0xC9, 0xA9, 0xE9, 0x99, 0xD9, 0xB9, 0xF9,
0x85, 0xC5, 0xA5, 0xE5, 0x95, 0xD5, 0xB5, 0xF5,
0x8D, 0xCD, 0xAD, 0xED, 0x9D, 0xDD, 0xBD, 0xFD,

TABLE 5-continued

0x83, 0xC3, 0xA3, 0xE3, 0x93, 0xD3, 0xB3, 0xF3,
0x8B, 0xCB, 0xAB, 0xEB, 0x9B, 0xDB, 0xBB, 0xFB,
0x87, 0xC7, 0xA7, 0xE7, 0x97, 0xD7, 0xB7, 0xF7,
0x8F, 0xCF, 0xAF, 0xEF, 0x9F, 0xDF, 0xBF, 0xFF,

TABLE 6

0x00, 0x80, 0x40, 0xC0, 0x20, 0xA0, 0x60, 0xE0,
0x10, 0x90, 0x50, 0xD0, 0x30, 0xB0, 0x70, 0xF0,
0x08, 0x88, 0x48, 0xC8, 0x28, 0xA8, 0x68, 0xE8,
0x18, 0x98, 0x58, 0xD8, 0x38, 0xB8, 0x78, 0xF8,
0x04, 0x84, 0x44, 0xC4, 0x24, 0xA4, 0x64, 0xE4,
0x14, 0x94, 0x54, 0xD4, 0x34, 0xB4, 0x74, 0xF4,
0x0C, 0x8C, 0x4C, 0xCC, 0x2C, 0xAC, 0x6C, 0xEC,
0x1C, 0x9C, 0x5C, 0xDC, 0x3C, 0xBC, 0x7C, 0xFC,
0x02, 0x82, 0x42, 0xC2, 0x22, 0xA2, 0x62, 0xE2,
0x12, 0x92, 0x52, 0xD2, 0x32, 0xB2, 0x72, 0xF2,
0x0A, 0x8A, 0x4A, 0xCA, 0x2A, 0xAA, 0x6A, 0xEA,
0x1A, 0x9A, 0x5A, 0xDA, 0x3A, 0xBA, 0x7A, 0xFA,
0x06, 0x86, 0x46, 0xC6, 0x26, 0xA6, 0x66, 0xE6,
0x16, 0x96, 0x56, 0xD6, 0x36, 0xB6, 0x76, 0xF6,
0x0E, 0x8E, 0x4E, 0xCE, 0x2E, 0xAE, 0x6E, 0xEE,
0x1E, 0x9E, 0x5E, 0xDE, 0x3E, 0xBE, 0x7E, 0xFE,
0x01, 0x81, 0x41, 0xC1, 0x21, 0xA1, 0x61, 0xE1,
0x11, 0x91, 0x51, 0xD1, 0x31, 0xB1, 0x71, 0xF1,
0x09, 0x89, 0x49, 0xC9, 0x29, 0xA9, 0x69, 0xE9,
0x19, 0x99, 0x59, 0xD9, 0x39, 0xB9, 0x79, 0xF9,
0x05, 0x85, 0x45, 0xC5, 0x25, 0xA5, 0x65, 0xE5,
0x15, 0x95, 0x55, 0xD5, 0x35, 0xB5, 0x75, 0xF5,
0x0D, 0x8D, 0x4D, 0xCD, 0x2D, 0xAD, 0x6D, 0xED,
0x1D, 0x9D, 0x5D, 0xDD, 0x3D, 0xBD, 0x7D, 0xFD,
0x03, 0x83, 0x43, 0xC3, 0x23, 0xA3, 0x63, 0xE3,
0x13, 0x93, 0x53, 0xD3, 0x33, 0xB3, 0x73, 0xF3,
0x0B, 0x8B, 0x4B, 0xCB, 0x2B, 0xAB, 0x6B, 0xEB,
0x1B, 0x9B, 0x5B, 0xDB, 0x3B, 0xBB, 0x7B, 0xFB,
0x07, 0x87, 0x47, 0xC7, 0x27, 0xA7, 0x67, 0xE7,
0x17, 0x97, 0x57, 0xD7, 0x37, 0xB7, 0x77, 0xF7,
0x0F, 0x8F, 0x4F, 0xCF, 0x2F, 0xAF, 0x6F, 0xEF,
0x1F, 0x9F, 0x5F, 0xDF, 0x3F, 0xBF, 0x7F, 0xFF

What is claimed is:

1. A method of creating a representation of a personal computer file, the method comprising:
   a. for each of at least some of a plurality of portions of the personal computer file:
      exclusive oring said portion with a different one of a plurality of first portions of a work area to produce a result; and
      storing the result in place of said different one of the plurality of first portions of the work area;
   b. for each of a plurality of second portions of the work area:
      retrieving a portion of a table responsive to said second portion of the work area; and
      storing the portion of the table retrieved in place of said second portion of the work area;
   c. following step b, dividing at least a portion of the work area into a first sub portion comprising a at least one third portion and a second sub portion comprising at least one fourth portion;
   d. exclusive oring each of the third portions of the work area with the fourth portions of the work area; and
   e. providing the first sub portion as the representation of the personal computer file.

2. The method of claim 1 wherein each of the plurality of second portions of the work area is a different one of the plurality of first portions of the work area.

3. The method of claim 1, wherein:
   step a is performed for a quantity of portions of the personal computer file equal to a quantity of first portions of the work area;
   step b is performed for substantially all of the second portions of the work area; and
   step a is performed after Step b for at least one portion of the personal computer file not used in the prior instance of step a.

4. The method of claim 3 wherein a first iteration of steps c and d are performed on the at least the portion of the work area substantially comprising the entire work area; and
   at least one subsequent iteration of steps c and d is performed, and for each subsequent iteration, the at least the portion of the work area for said subsequent iteration is one of the first sub portion and the second sub portion of the work area.

5. The method of claim 1 additionally comprising selecting the table from a plurality of tables.

6. The method of claim 5 wherein the table is selected from the plurality of tables is selected using a first order of the plurality of tables, the first order different from a second order used to select the table at a prior time.

7. A system for creating a representation of a personal computer file, the system comprising:
   a. an exclusive or operator having an coupled to receive at least some of the plurality of portions of the personal computer file and an input/output coupled to a work area, the exclusive or operator for, for each of at least some of a plurality of portions of the personal computer file, exclusive oring said portion with a different one of a plurality of first portions of the work area to produce a result, and for, for each of at least some of a plurality of portions of the personal computer file, storing the result in place of said different one of the plurality of first portions of the work area;
   b. a translator having an input/output coupled to the work area, the translator for, for each of a plurality of second portions of the work area, retrieving a portion of a table responsive to said second portion of the work area; and for each of a plurality of second portions of the work area, storing the portion of the table retrieved in place of said second portion of the work area; and
   c. wherein the exclusive or operator is additionally for, following operation of translator, dividing at least a portion of the work area into a first sub portion comprising a at least one third portion and a second sub portion comprising at least one fourth portion and exclusive oring each of the third portions of the work area with the fourth portions of the work area; and providing at an output the first sub portion as the representation of the personal computer file.

8. The system of claim 7 wherein each of the plurality of second portions of the work area is a different one of the plurality of first portions of the work area.

9. The system of claim 7, wherein:
   the exclusive or operator performs the functions in paragraph a for a quantity of portions of the personal computer file equal to a quantity of first portions of the work area;
   the translator performs the functions in paragraph b for substantially all of the second portions of the work area; and
   the exclusive or operator performs the functions in paragraph a after the translator performs the functions in paragraph b for at least one portion of the personal computer file not used in the prior performance of the functions in paragraph a.

10. The system of claim 9 wherein the exclusive or operator performs a first iteration of the functions in paragraph c on the at least the portion of the work area substantially comprising the entire work area; and the exclusive or operator performs the functions in paragraph c in at least one subsequent iteration, and for each subsequent iteration, the at least the portion of the work area for said subsequent iteration is one of the first sub portion and the second sub portion of the work area.

11. The system of claim 1 additionally comprising a table identifier coupled to the translator for selecting the table from a plurality of tables and providing an identifier of the selected table to the translator.

12. The method of claim 5 wherein the table identifier selects the table from the plurality of tables using a first order of the plurality of tables, the first order different from a second order used to select the table at a prior time.

13. A computer program product comprising a computer useable medium having computer readable program code embodied therein for creating a representation of a personal computer file, the computer program product comprising computer readable program code devices configured to cause a computer to:

a. for each of at least some of a plurality of portions of the personal computer file:
exclusive or said portion with a different one of a plurality of first portions of a work area to produce a result; and
store the result in place of said different one of the plurality of first portions of the work area;

b. for each of a plurality of second portions of the work area:
retrieve a portion of a table responsive to said second portion of the work area; and
store the portion of the table retrieved in place of said second portion of the work area;

c. following the computer readable program code devices in paragraph b, divide at least a portion of the work area into a first sub portion comprising a at least one third portion and a second sub portion comprising at least one fourth portion;

d. exclusive or each of the third portions of the work area with the fourth portions of the work area; and e. provide the first sub portion as the representation of the personal computer file.

14. The computer program product of claim 13 wherein each of the plurality of second portions of the work area is a different one of the plurality of first portions of the work area.

15. The computer program product of claim 13, wherein:
the computer readable program code devices of paragraph a are performed for a quantity of portions of the personal computer file equal to a quantity of first portions of the work area;
the computer readable program code devices of paragraph b are performed for substantially all of the second portions of the work area; and
the computer readable program code devices of paragraph a are performed after the computer readable program code devices of paragraph b for at least one portion of the personal computer file not used in the prior performance of the computer readable program code devices of paragraph a.

16. The computer program product of claim 15 wherein a first iteration of the computer readable program code devices of paragraphs c and d are performed on the at least the portion of the work area substantially comprising the entire work area; and
at least one subsequent iteration of the computer readable program code devices of paragraphs c and d is performed, and for each subsequent iteration, the at least the portion of the work area for said subsequent iteration is one of the first sub portion and the second sub portion of the work area.

17. The computer program product of claim 13 additionally comprising computer readable program code devices configured to cause a computer to select the table from a plurality of tables.

18. The computer program product of claim 17 wherein the table is selected from the plurality of tables is selected using a first order of the plurality of tables, the first order different from a second order used to select the table at a prior time.

* * * * *